United States Patent [19]

Donley

[11] 4,170,460

[45] Oct. 9, 1979

[54] METHOD OF MAKING COLORED GLASS ARTICLES

[75] Inventor: Harold E. Donley, Oakmont, Pa.

[73] Assignee: PPG Industries, Inc., Pittsburgh, Pa.

[21] Appl. No.: 845,102

[22] Filed: Oct. 25, 1977

Related U.S. Application Data

[63] Continuation of Ser. No. 697,310, Jun. 18, 1976, abandoned, which is a continuation-in-part of Ser. No. 544,081, Jan. 27, 1975, abandoned.

[51] Int. Cl.$^2$ .............................................. C03C 17/00
[52] U.S. Cl. ................................... 65/30 R; 65/60 A; 65/60 C; 65/60 D; 65/99 A; 427/50; 427/165; 427/166; 427/167; 427/226; 427/229; 427/255
[58] Field of Search ................... 65/30 R, 30 E, 60 A, 65/60 C, 60 D, 99 A; 427/12, 50, 165–167, 226, 229, 255

[56] References Cited

U.S. PATENT DOCUMENTS

| | | | |
|---|---|---|---|
| 3,081,200 | 3/1963 | Tomkins | 117/213 |
| 3,410,710 | 11/1968 | Mochel | 60/30 X |
| 3,467,508 | 9/1969 | Loukes et al. | 65/30 |
| 3,652,246 | 3/1972 | Michelotti et al. | 65/60 X |
| 3,656,926 | 4/1972 | Loukes et al. | 65/60 C |
| 3,660,061 | 5/1972 | Donley et al. | 65/60 D X |

*Primary Examiner*—Robert L. Lindsay, Jr.
*Attorney, Agent, or Firm*—Donna L. Seidel

[57] ABSTRACT

A glass substrate is modified by enriching a surface portion of the substrate with a metal such that the refractive index of the surface portion is different from that of the unmodified glass matrix. The modified surface is then coated with a metal oxide film to produce durable articles in a variety of interference-type colors suitable for architectural use to control incident solar energy.

10 Claims, No Drawings

METHOD OF MAKING COLORED GLASS ARTICLES

CROSS-REFERENCE TO RELATED APPLICATIONS

This application is a continuation of U.S. Ser. No. 697,310, filed on June 18, 1976, now abandoned which is a continuation-in-part of U.S. Ser. No. 544,081, entitled COATING GLASS filed on Jan. 27, 1975 by the same inventor and is related to U.S. Ser. No. 697,309, entitled COLORED GLASS ARTICLES filed by the same inventor.

BACKGROUND OF THE INVENTION

1. Field of the Invention

This invention relates to colored glass and particularly relates to the production of metal oxide coated glass for solar energy control.

2. Description of the Prior Art

In the preparation of metal or metal oxide films on large substrates there has been a significant body of teaching relating to the preparation of such coatings by pyrolytic techniques. The art of pyrolytic coating of glass is characterized by the following patents:

U.S. Pat. No. 3,081,200 to Tompkins and U.S. Pat. No. 3,410,710 to Mochel teach that metal oxide coatings may be applied to refractory materials by contacting the refractory, while hot, with compositions containing metal diketonates.

U.S. Pat. No. 3,652,246 to Michelotti and Henry and U.S. Pat. No. 3,660,061 to Donley, Rieser and Wagner teach the application of metal oxide coating on a continuous ribbon of float glass having dissolved tin in its surface regions.

These described patents provide a recent history of the development of the art of coating glass with metal oxides by pyrolysis. As each improvement in turn has been implemented, coatings of improved quality both as to appearance and durability have been obtained. Metal oxides of a variety of metals may be deposited on glass by techniques known in the art. Metal oxides deposited in the manner taught by Donley, Rieser and Wagner are found to adhere to glass with sufficient tenacity to provide coatings capable of withstanding prolonged atmospheric attack in exposed architectural applications. However, accelerated weathering tests have shown that, depending upon the particular metal oxide or combinations of metal oxides present in the coating compositions, some of the metal oxide coatings will fail after prolonged exposure to corrosive atmospheres, such as those containing acidic pollutants or salt water. Improved durability of all useful metal oxide coatings on glass has been considered a desirable objective. Also, since the composition changes necessary to produce differing color effects yield films of differing durability, it has been an objective to increase the range of colors that may be achieved with a given composition so that a variety of colors are available for use without the necessity of prolonged durability testing for each new colored coating prior to its use.

In U.S. Pat. No. 3,467,508 Loukes et al. teach a method of making colored glass articles. By modifying the surface of the glass substrate with selected metals, other than the tin which is normally present at the surface of float formed soda-lime-silica glass, it is possible to provide the glass with stained surface layers of various desired colors. Unfortunately, such metal modified glass surfaces, characterized in the art as "ion-exchanged" surfaces, are relatively soft and are easily damaged by mild abrasion. Therefore, it is practical to limit the use of such articles to interior applications or double glazed windows where durability is not as critical as for exposed exterior surfaces.

Coatings made by the described pyrolytic techniques and stains made by the described "ion-exchange" technique yield colored articles wherein the colors depend on the composition of the coloring medium. In order to obtain different colors it is necessary to modify the components of the coloring medium. A preferable result would follow from the utilization of the same basic composition to provide a variety of colors.

It is known that selectively reflecting and transmitting interference filters can be produced by using materials of widely different indices of refraction in multiple-layer films of controlled thicknesses. Such multiple-layer films have been designed to effectively filter out all but narrow bands of light having the desired dominant wavelengths. These prior art multiple-layer films have usually been made by vacuum evaporation deposition techniques. Such evaporation deposition methods are not readily adaptable to continuously coating large sheets of glass for use as viewing enclosures in architectural applications. On the other hand, pyrolytic techniques normally used to continuously coat large sheets of glass are not particularly suited to making multiple-layer films. Reheating would generally be required between coating steps and this can easily cause distortion in both the glass and the previously applied layers of the final film.

SUMMARY OF THE INVENTION

The surface of a glass substrate is modified by dissolving at least one metal, such as gold, silver, copper, nickel, platinum or palladium, into a surface of the glass substrate. This modification is preferably accomplished by contacting the glass surface with a pure metal or metal alloy under reducing conditions and at a temperature sufficient to permit migration of the metal into the glass surface where it may be present in metallic form or incorporated into the oxide matrix of the glass. The modified surface, preferably while still at an elevated temperature and preferably after brief exposure to an oxidizing atmosphere, is contacted with a metal-containing coating composition under such conditions as to cause pyrolyzation of the coating composition and deposition of a metal oxide coating on the surface of the substrate.

The resultant articles exhibit increased solar energy control capabilities, improved durability, and flexibility in the selection of reflected and transmitted colors when compared with articles made by the techniques of the previously described references.

The present invention provides a method for producing metal oxide coated glass of surprisingly superior durability and, in addition, a wide range of uniform colors heretofore unattainable by pyrolytic techniques.

Employing the method of the present invention produces certain uniform colors, previously obtainable only by interference techniques employing multiple-layer films, by using pyrolytic techniques. A single coating provides a variety of color effects heretofore obtainable only with multiple-layer coatings, thereby eliminating significant reheating costs. This single coating can be applied in a continuous run procedure using pyrolysis for application of a metal oxide film after dissolving a color imparting metal into the immediate surface of the glass substrate. In order to obtain articles having particular reflectance and transmittance characteristics and exhibiting desired color characteristics when viewed either in reflectance or transmittance, metals or combinations thereof having a particular index of refraction are selected and the thicknesses of the modified glass-metal layer and of the metal oxide film are controlled.

A pure metal or metal alloy is dissolved into the surface of the glass matrix by maintaining molten, solid, or vaporized metal in contact with the glass surface at an elevated temperature, preferably above the softening point of the glass and under reducing conditions. In preferred embodiments of the present invention, the desired metal is maintained on the glass surface as a molten pool.

The dissolution of pure metal or metal alloy may be permitted to proceed by diffusion with thermal energy alone to enhance the rate of metal dissolution or the rate may be accelerated by electrochemical techniques such as by providing an electric potential across the contacting metal and the glass. When an electric potential is used as the driving force, the metal or alloy is maintained on the surface of a glass substrate which is to be modified while the opposite surface is contacted with an electroconductive material.

The metal confined on the surface of the glass may be an alloy of tin, lead or bismuth with an element selected from the group of elements consisting of gold, silver, platinum, palladium, nickel or copper or combinations thereof. The metal or metal alloy migrates into the glass matrix establishing a metal content in the glass which is greatest near the contacted surface and decreases toward the interior of the glass. The metal-enriched portion of the glass substrate has a higher refractive index than the interior glass matrix.

The surface of the glass which has been modified by the metal is then contacted, preferably while still at an elevated temperature, with a coating composition which pyrolyzes or otherwise reacts to form a metal oxide coating. The coating step may occur after a brief or a long exposure of the metal-modified glass to oxidizing conditions or may occur without interim oxidation.

The coating composition principally comprises a metal coating reactant which will pyrolyze or otherwise react to form a metal oxide coating upon contact with the glass. It may also include a solvent and/or a carrier gas for the coating reactants employed. The coating composition may be dispensed toward the glass as a liquid or vapor. Various metal salts having well known film-forming properties may be used as coating reactants. U.S. Pat. No. 3,244,547 to L. E. Orr et al., U.S. Pat. No. 3,658,568 to Donley and U.S. Pat. No. 2,564,708 show compositions capable of forming colored metal oxide films. However, more typical of the coating reactants employed in the present invention are organometallic salts known in the coating art such as acetates, hexoates and the like. While many such organometallic salts are suitable to pyrolyze on contact with hot glass to form a metal oxide coating, superior films result from various metal acetylacetonates in an organic vehicle. Preferred is a family of compositions containing one or more of the acetylacetonates of cobalt, iron and chromium.

Other pleasingly colored coating compositions are produced by using another family of compositions containing salts of one or more metals of the class consisting of copper, manganese and nickel. Still other suitable coloring compositions contain salts of one or more of any of the six metals enumerated above, as well as vanadium and titanium salts that form metal oxides by pyrolysis on contact with a glass surface. Other coatings, such as coatings comprising chromium oxide alone or in combination with iron oxide may be effectively employed in this invention. For example, coatings comprising about 25 percent iron oxide and 75 percent chromium oxide deposited over clear or tinted glass containing copper in its surface region provide particularly desirable articles.

If a solvent is employed, as in the preferred embodiments, the solvent should be relatively stable, non-explosive, have a high boiling point and not break down into corrosive products. Solvents which may be used to advantage include aliphatic and cyclic hydrocarbons, halocarbons and halogenated hydrocarbons. Solvents, such as benzene and toluene, may be employed for economy although certain performance advantages accrue from the use of halogen-containing materials as pointed out below.

Methylene chloride ($CH_2Cl_2$) is an excellent solvent for many organometallic salts used, has a sufficiently high boiling point to remain a liquid until it contacts the hot glass ribbon, and is sufficiently non-explosive and non-flammable to be safe for handling. Furthermore, this solvent appears to be chemically stable and does not break down into corrosive compounds such as HCl and methane.

Several other aliphatic and olefinic halocarbons and halogenated hydrocarbons meet these requirements. These include:
methylene bromide ($CH_2Br_2$)
carbon tetrachloride ($CCl_4$)
carbon tetrabromide ($CBr_4$)
chloroform ($CHCl_3$)
bromoform ($CHBr_3$)
1,1,1-trichloroethane ($Cl_3C-CH_3$)
perchloroethylene ($Cl_2C=CCl_2$)

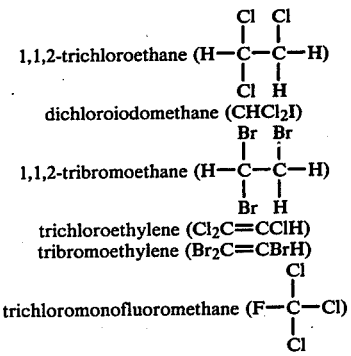

hexachloroethane ($Cl_3C-CCl_3$)
1,1,1,2-tetrachloro-2-fluoroethane ($Cl_3C-CHClF$)
1,1,2-trichloro-1,2-difluoroethane ($FCl_2C-CHClF$)
tetrafluorobromoethane ($F_3C-CFBrH$) or ($F_2BrC-CF_2H$)
hexachlorobutadiene ($CCl_2=CCl-CCl=CCl_2$) and
tetrachloroethane ($Cl_2HC-CHCl_2$)

In addition, mixtures of two or more of the aforesaid organic solvents which are compatible may be used.

Other solvents having superior dissolving power for the metal salts used, such as various mixtures of one or more organic polar compounds, such as an alcohol containing one or four carbon atoms and one hydroxyl group, or one or more aromatic non-polar compounds taken from the class consisting of benzene, toluene and xylene may be used with caution. However, their volatility makes them more difficult to handle than the solvents listed above.

This invention may be advantageously carried out in conjunction with a process for forming flat glass by floating it on molten tin. After the glass has assumed a dimensionally stable configuration on a pool of molten tin, it is contacted on its top surface with a pure metal or a metal alloy which migrates into the surface of the glass. The rate of migration may be accelerated by externally applied electrochemical forces. After leaving the float chamber, the metal-modified surface of the glass is contacted with a metal-containing coating composition while the glass temperature is maintained sufficiently high to cause pyrolysis of the coating composition. The glass may be subjected to an oxidizing atmosphere between the steps of metal migration and metal oxide coating; this is preferred to further enhance the durability of the resulting film. Apparatus for applying a metal oxide coating to the glass emerging from a float chamber is illustrated and described in U.S. Pat. Nos. 3,660,061 and 3,689,304. If an annealed final product is desired, coating is accomplished by immediately spraying the glass ribbon with the metal oxide forming solution within seconds after it leaves the float forming chamber. The coated, annealed ribbon is then cut to the desired dimensions. If a tempered or heat strengthened product is desired, the heating and coating steps may be performed subsequent to the forming of glass or in a separate operation.

This method results in an article which exhibits exceptional durability and also provides a wide variety of colors by reflectance and transmittance. The metal that is dispersed into the immediate surface layer of the glass substrate is relatively concentrated in the first micron or two beneath the surface. In general, this concentration gradually decreases until at a depth of about 12 to 14 microns there is only a trace of metal. The result is an alteration of the index of refraction at the glass surface while not affecting that of the remainder of the substrate. The standard glass composition and the comparatively very thin comixture of glass and metal have distinctively different indices of refraction. Coating such a metal modified surface of a glass substrate with a metal oxide film produces two unexpected results.

First is an unexpected increase in durability. The glass surface as modified by the addition of metal is relatively soft and can be easily removed by mild abrasion. The described metal oxide films, when applied directly to an unmodified surface of a glass substrate, are durable and may be used in single glazed architectural applications. However, the combination of a durable metal oxide film and a soft, non-durable surface-modified substrate yields a product having significantly increased durability over one produced by applying the same metal oxide to a non-modified glass substrate, even one containing tin in its surface regions by virtue of its manufacture by floating on tin.

Second, the present invention allows the production of a variety of uniform colors with each coating composition employed. Such a variety of colors from a single composition had previously been unattainable by conventional pyrolytic techniques. In order to obtain a variety of colors by interference techniques, it is necessary to use two or more coatings, each of fixed composition having widely different indices of refraction in alternate layers to provide multiple-layer films having optical thickness of approximately one-quarter of the wavelength of the visible light to be selectively reflected. The optical thickness of a film is defined as the actual thickness times the index of refraction. The median wavelength of the visible range is approximately 5,800 angstroms (580 nm). Therefore, in order to obtain interference colors having approximately this dominant wavelength, the optical thickness of the film should be approximately 1,450 angstroms (145 nm).

The bulk index of refraction of common glass is about 1.52. This value will vary slightly with composition, but remains essentially in the range of from 1.50 to 1.56 for such common glasses as soda-lime-silica glasses. The bulk index of refraction of the metal oxides used for the coatings in the present invention vary from about 2.0 to 3.0. The measured index of refraction of thin pyrolytic films is lower than the bulk index of refraction, but as the thickness of a film is increased, void spaces in the film become filled and the index of refraction of the film approaches the bulk value for the metal oxide comprising the film. Metal oxide films at least 600-800 angstroms (60-80 nm) thick deposited on ordinary glass are observed to display interference colors. However, it is difficult to produce pyrolytic films of this threshold thickness and maintain uniformity. Furthermore, the presence of interference colors accentuates the nonuniformity of the film.

By modifying the surface of the glass substrate to increase the index of refraction of the substrate, it is possible to produce uniform colors, such as those produced by interference, using metal oxide films of less than one-quarter wavelength optical thickness. This result is unique in that such colors cannot be produced by applying thin films to normal tinted glasses or to the tin-enriched surface of float glass. This may be due to the fact that in neither process is there a significant increase in index of refraction over that of clear glass produced by conventional methods. The glass composition remains essentially unchanged with the tint being derived from the addition of a small concentration of colorant which is uniformly distributed throughout the entire thickness of the glass. Concentrations of colorant as high as one percent are not uncommon in commercially available tinted glasses. However, the concentration is relatively constant throughout the glass, and metal oxide coatings on such glasses reflect a color that is essentially the same as that of the same coating on clear glass.

The invention will be more fully understood from the detailed descriptions of the preferred embodiments which follow.

DESCRIPTION OF THE PREFERRED EMBODIMENTS

Soda-lime-silica glass is prepared by compounding raw materials, melting them to form molten glass and refining the molten glass according to known techniques. Soda-lime-silica glasses normally contain by weight about 60 to 75 percent $SiO_2$; 10 to 15 percent $Na_2O$; 0 to 5 percent $K_2O$, the sum of $Na_2O$ plus $K_2O$ being 10 to 15 percent; 5 to 15 percent $CaO$; 0 to 10 percent $MgO$, the sum of $CaO$ and $MgO$ being 5 to 15 percent; 0 to 1 percent $Al_2O_3$ and minor amounts of other ingredients for fining and coloring the glass. Examples of colored lime-soda-silica glasses are described in U.S. Pat. Nos. Re 25,312 and 3,296,004.

The process can be carried out by treating glass made by any of the standard known flat glass processes such as float, sheet or plate glass. However, the float process is preferred. This invention may be further appreciated by reference to the following examples.

EXAMPLE I

Flat glass having the following approximate composition is produced by floating the glass on molten tin in a reducing atmosphere containing tin vapors.

|  | Percent by Weight |
|---|---|
| $SiO_2$ | 72.0 |
| $Na_2O$ | 13.3 |
| $K_2O$ | 0.6 |
| CaO | 8.9 |
| MgO | 3.8 |
| $Al_2O_3$ | 1.0 |
| $SO_3$ | 0.3 |
| $Fe_2O_3$ | 0.10 |

The glass produced in accordance with this method has an equilibrium thickness of approximately one-quarter inch or seven millimeters. This equilibrium thickness glass was used for all of the experiments described in the present examples.

During formation, tin enters both the top surface and the bottom surface of the glass. The top surface of the glass is exposed during forming to a gaseous atmosphere containing tin vapor in addition to nitrogen and hydrogen which fills the space in a forming chamber above the pool of molten tin on which the glass is floated to form it into flat glass. The bottom surface of the glass rests directly on the pool of molten tin. The average temperature of the molten tin is from about 1400° F. to about 1600° F. The glass is present in the tin-containing forming chamber for a period of from about 5 minutes to about 15 minutes.

In the forming chamber the top surface of the glass is contacted with a pool of molten copper and lead comprising about 2 percent by weight copper and about 98 percent by weight lead. An electric current is passed through the glass between the pool of the copper-lead alloy and the underlying pool of tin. Copper and lead are driven into the glass through its top surface. Presumably, some of the tin which has been dissolved into the surface during the float process and the alkali metals present at the surface in the glass matrix are driven from the glass. The lead ions, probably due to their size, remain essentially at the surface. The depth of copper penetration can be increased with an increase in voltage across the system, but it too remains concentrated near the surface. Variation of color by reflectance and transmittance can be attained by controlling the voltage in order to produce a desired concentration and depth of penetration of the exchanged metal or metal alloy. This is essentially the process described in U.S. Pat. No. 3,467,508 to Loukes et al., which is incorporated by reference herein.

The resulting glass is removed and cooled without further treatment and analyzed by conventional electron probe techniques and exhibits copper and lead concentrations as shown here in percents by weight. Table I summarizes the properties of a colored glass substrate stained by the described surface modification method.

TABLE I

| Depth Beneath Top Surface (Microns) | Percent Cu | Percent Pb |
|---|---|---|
| 1.5 | 1.3 | 2.0 |
| 2.5 | 1.2 | 0.17 |
| 3.5 | 0.73 | 0.04 |
| 4.5 | 0.35 | 0 |
| 5.5 | 0.33 | |
| 6.5 | 0.34 | |
| 7.5 | 0.36 | |
| 8.5 | 0.37 | |
| 9.5 | 0.36 | |
| 10.5 | 0.37 | |
| 11.5 | 0.29 | |
| 12.5 | 0.21 | |
| 13.5 | 0.10 | |
| 14.5 | 0.06 | |

The table clearly indicates that essentially all of the dissolved lead remains at the immediate glass surface, penetrating to a depth of about 1.5 to 2.0 microns, while the dissolved copper penetrates into the glass substrate to a depth of about 10 to 12 microns, beyond which only trace amounts of the metal are found. Although some tin may be driven out by dissolving lead and copper, the surface region of the glass substrate remains tin-enriched in comparison with the interior region. Approximately 0.01 to 0.1 percent tin remains in the surface region of the glass substrate.

The metal alloy is highly concentrated at the contacted surface and does not diffuse through the entire thickness of the glass. It is this high concentration of metal acting as a stain that imparts the color and spectral characteristics to the modified substrate. The glass thus modified differs from commonly known tinted or colored glasses in that it obtains its color because of this high concentration of metal at the glass surface rather than a relatively uniform concentration of colorant throughout the thickness of the glass substrate.

The surface modified glass has the following spectral properties with light incident to the modified surface:

TABLE II

| TRANSMITTANCE PROPERTIES | |
|---|---|
| Luminous transmittance (percent) | 49.2 |
| Ultraviolet transmittance (percent) | 16.2 |
| Infrared transmittance (percent) | 64.7 |
| Total solar energy transmittance (percent) | 55.8 |
| Dominant transmitted wavelength (nanometers) | 577.7 |
| Excitation purity (percent) | 17.65 |
| Index of Refraction (apparent)* | 1.33 |
| Extinction Coefficient (apparent)* | 0.64 |

*Although these values are based upon elipsometer measurements at the mercury vapor greenline of 546.1 nm, they are apparent values since the surface modified layer is not of infinite thickness compared to the penetration of the light and is not of uniform composition as evidenced in Table I.

| REFLECTANCE PROPERTIES | |
|---|---|
| Luminous reflectance (percent) | 11.10 |
| Ultraviolet reflectance (percent) | 4.22 |
| Infrared reflectance (percent) | 10.14 |
| Total solar energy reflectance (percent) | 10.20 |
| Dominant reflected wavelength (nanometers) | 576.08 |
| Excitation purity (percent) | 15.75 |

Several sheets of the surface modified glass are heated to about 1100° F. in air and sprayed with solutions consisting of approximately 2 percent by weight metal in a methylene chloride solvent. Stock solutions of the metal containing composition are prepared by dissolving approximately one pound (454 grams) of metal acetylacetonate in one gallon (3.78 liters) of methylene chloride resulting in the 2 percent by weight metal solution.

These solutions were then sprayed against selected hot glass sheets either separately or as mixtures proportioned as follows:

| SPRAY SOLUTION | METAL COMPONENTS (2% by Weight in Solution) |
|---|---|
| A | 100 percent cobalt acetylacetonate |
| B | 100 percent iron acetylacetonate |
| C | 100 percent chromium acetylacetonate |
| D | 70 percent iron acetylacetonate and 30 percent nickel acetylacetonate |
| E | 100 percent titanium acetylacetonate |

The resulting coated sheets of glass have the following spectral properties with light incident to their coated surfaces.

TABLE III

| Coated Glass with Solutiuon | A | B | C | D | E |
|---|---|---|---|---|---|
| TRANSMITTANCE PROPERTIES | | | | | |
| Luminous transmittance (%) | 29 | 28 | 43 | 39 | 52 |
| Ultraviolet transmittance (%) | 6 | 2 | 5 | 5 | 17 |
| Infrared transmittance (%) | 50 | 54 | 55 | 63 | 65 |
| TSE transmittance (%) | 38 | 41 | 48 | 50 | 57 |
| Dominant wavelength (nanometers) | 581 | 581 | 578 | 579 | 577.3 |
| Excitation purity (%) | 39 | 50 | 32 | 40.7 | 15.7 |

These characteristics can be easily modified by changing the film compositions and thicknesses to yield a broad range of desirable colors. All of the samples perform satisfactorily in standard Federal Testing Method cyclic humidity (FTM 810B) and 5 percent salt spray (FTM 151A) tests. They show little or no deterioration after over 1400 hours of each test. This is especially significant in the case of cobalt oxide films (Sample A) which fail within 24 hours of exposure to salt spray testing when applied to standard plate, sheet, or float glasses.

The uncoated surface modified glasses also perform equally well in these two tests. However, when tested for abrasion resistance, the colored modified surfaces are easily removed from these uncoated samples with only light abrasion of the surface with pumice or cerium dioxide. The samples with an overcoat of metal oxide on the modified surface, Samples A through E, withstand vigorous abrading with the above two agents and show no sign of deterioration following prolonged rubbing with pumice.

The metal oxide overcoat provides significantly increased abrasion resistance compared with the uncoated metal-modified surface and provides colors not available using solely the surface modification process or known pyrolytic coating techniques. The combination of the metal-modified surface and the pyrolytic metal oxide coating provides a means for obtaining a variety of uniform colors which have not heretofore been attainable with fixed coating compositions except by the interference technique employing multiple-layer films.

In addition to improved durability and increased color flexibility, the metal oxide coated glass demonstrates improved solar energy control capabilities over that of the uncoated surface-modified glass as can be seen by a comparison of TABLES II and III. Except for Sample E, a titanium oxide overcoat, total solar energy transmittance is decreased and total solar energy reflectance is increased at least twofold. This means that less heat is transmitted directly to an enclosed space within a building glazed with the articles of this invention and significantly less solar energy is absorbed by such glass articles. This helps to alleviate the problem of thermal breakage encountered when using high solar energy absorbing glasses in architectural applications.

EXAMPLE II

An additional sample of the surface-modified glass is prepared according to the procedure of Example I. The resultant metal-modified glass sheets have the following spectral properties with light incident to their metal-modified surfaces. The transmittance properties were approximately the same as the glass of Example I although the reflectance properties differ for this sample of glass. It is believed that the copper may be more concentrated in the extreme surface region of this glass.

TABLE IV

| TRANSMITTANCE PROPERTIES | |
|---|---|
| Luminous transmittance (percent) | 44.88 |
| Ultraviolet transmittance (percent) | 17.34 |
| Infrared transmittance (percent) | 65.27 |
| Total solar energy transmittance (percent) | 54.13 |
| Dominant transmitted wavelength (nanometers) | 580.88 |
| Excitation purity (percent) | 11.99 |
| Index of refraction (apparent)* | 1.4 |
| REFLECTANCE PROPERTIES | |
| Luminous reflectance (percent) | 23.35 |
| Ultraviolet reflectance (percent) | 11.58 |
| Infrared reflectance (percent) | 6.84 |
| Total solar energy reflectance (percent) | 14.28 |
| Dominant reflected wavelength (nanometers) | 562.86 |
| Excitation purity (percent) | 8.19 |

*Estimated from luminous transmittance value.

The metal-modified surface is removed by light abrasion with pumice and cerium dioxide from 4 inch by 6 inch sections of several 12 inch by 12 inch sheets of the above modified glass. The partially abraded sheets are then heated to about 1100° F. and sprayed with similarly produced metal oxide film-forming solutions according to the procedure described in Example I. A metal oxide coating as formed on both the abraded and unabraded glass surfaces. The coating solutions utilized had the following metal composition:

| SPRAY SOLUTION | METAL COMPONENTS (2% by Weight in Solution) |
|---|---|
| A | 70 percent iron acetylacetonate and 30 percent nickel acetylacetonate |
| B | 30 percent cobalt acetylacetonate, 30 percent iron acetylacetonate and 40 percent chromium acetylacetonate |

The coated sheets were tested to determine the spectral properties of the coatings on the unabraded modified surfaces.

TABLE V

| | COATED MODIFIED SURFACE | |
|---|---|---|
| | A | B |
| TRANSMITTANCE | | |
| Luminous transmittance (percent) | 39.01 | 40.31 |
| Ultraviolet transmittance (percent) | 6.16 | 11.82 |
| Infrared Transmittance (percent) | 59.26 | 61.20 |
| Total Solar energy transmittance (percent) | 46.40 | 48.92 |
| Dominant wavelength (nanometers) | 575.93 | 576.90 |
| Excitation purity (percent) | 32.38 | 14.11 |

TABLE V-continued

|  | COATED MODIFIED SURFACE | |
|---|---|---|
|  | A | B |
| REFLECTANCE | | |
| Luminous reflectance (percent) | 21.81 | 20.95 |
| Ultraviolet reflectance (percent) | 24.94 | 12.16 |
| Infrared reflectance (percent) | 14.41 | 10.63 |
| Total solar energy reflectance (percent) | 19.90 | 15.83 |
| Dominant wavelength (nanometers) | 605.24 | 577.96 |
| Excitation purity (percent) | 9.67 | 43.89 |

The glass coated with spray solution A is substantially the same as the glass of Example I coated with spray solution D of that example except that its coating is on the order of 500 angstroms (50 nanometers) thick which is about 200 angstroms (20 nanometers) thicker than the coating of Example I-A. It may be noted that, except for the hue or dominant wavelength of the reflected color, the properties of the coated glass of this Example (A) are substantially the same as those of the coated glass of Example I(D). The apparent color or hue of a coated glass article may thus be altered by merely altering the thickness of the coating on the glass while maintaining the composition of the coating unchanged.

for all coated sheets of glass, the metal oxide coating on the 4 inch by 4 inch area where the modified surface has been removed by abrasion is 95 percent removed in a period from about 4 hours to 4 days when subjected to the 5 percent salt spray test. The metal oxide coatings applied to the unabraded surface show little degradation after over 1400 hours of the salt spray test.

EXAMPLE III

An additional sample is prepared in accordance with the procedure of Example I except that silver is alloyed with the lead in lieu of copper and dissolved into the glass surface as described. This sample and samples of clear float glass and the copper-lead surface-modified glass are then coated with a 2 percent solution of cobalt acetylacetonate as described in Example I. The cobalt oxide film on the clear float glass begins to fail within four hours and is severely degraded in just a few days of accelerated testing using the standard 5 percent salt spray test. Both the copper and silver modified surfaces coated with the cobalt oxide perform well and show no attack after over 1600 hours of accelerated testing. These results clearly indicate the increased durability of the metal oxide coating when combined with a metal-modified surface of glass to produce the articles of the present invention.

The form of the invention shown and described in this disclosure represents certain illustrative embodiments. It is understood that various useful embodiments may be made without departing from the spirit of this invention.

I claim:

1. A method for making a colored glass article comprising the steps of:
   a. contacting a surface of a glass substrate with a metal selected from the group consisting of gold, silver, platinum, palladium, copper, nickel and mixtures thereof at a sufficiently high temperature and for a sufficient time to provide for migration of the metal into the contacted surface to produce a metal-modified glass portion immediately subjacent the metal-contacted surface having a refractive index sufficiently different from the refractive index of the unmodified portion of the glass substrate; to impart color to the glass substrate and
   b. contacting the colored metal-modified surface of the substrate with a coating composition containing a metal compound at a sufficiently high temperature to convert the metal compound to a metal oxide coating by thermal reaction on contact with the glass substrate.

2. The method according to claim 1 wherein the glass substrate is formed by floating molten glass on a pool of molten tin-containing metal, the contacting of the surface of the substrate with the metal being accomplished after the glass has achieved a dimensionally stable configuration on the pool of molten tin-containing metal.

3. The method according to claim 1, wherein the glass substrate is a flat glass substrate.

4. The method according to claim 1, wherein the metal is present as a molten alloy with a metal selected from the group consisting of tin, bismuth and lead.

5. The method according to claim 1, wherein the glass is a soda-lime-silica glass.

6. The method according to claim 1, wherein the substrate is exposed to an oxidizing atmosphere between the steps of surface modification and metal oxide coating.

7. The method according to claim 1, wherein an electroconductive material is provided on the surface of the substrate opposite the surface contacted by the metal and an electric current is passed through the substrate between the metal and the electroconductive material.

8. The method according to claim 1, wherein the coating composition contains a metal compound of a metal selected from the group consisting of cobalt, iron, chromium, copper, manganese, nickel, vanadium, and titanium and mixtures thereof.

9. The method according to claim 8, wherein the metal compound in the coating composition is a metal acetylacetonate.

10. The method according to claim 1, wherein step b is carried out substantially immediately following step a while maintaining the glass substrate at said temperature.

* * * * *